Feb. 18, 1964  H. E. RIORDAN  3,121,336
LINEAR MERCURY ACCELEROMETER
Filed Nov. 8, 1960  2 Sheets-Sheet 1
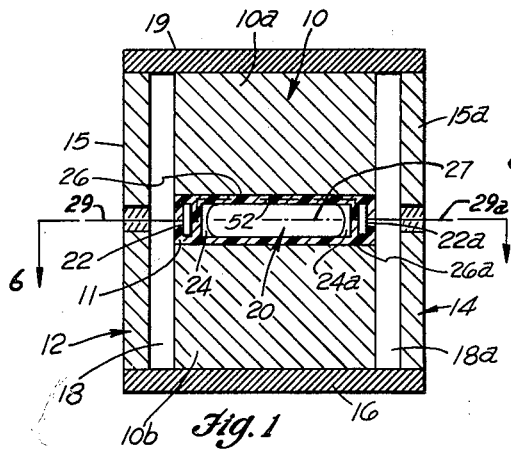
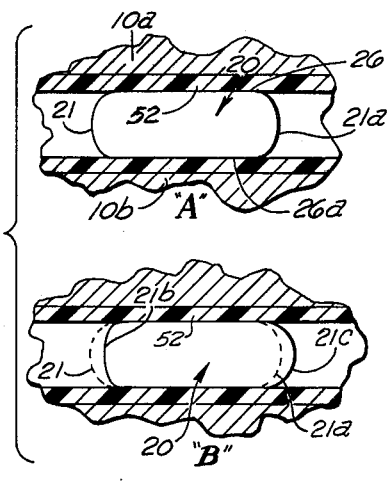
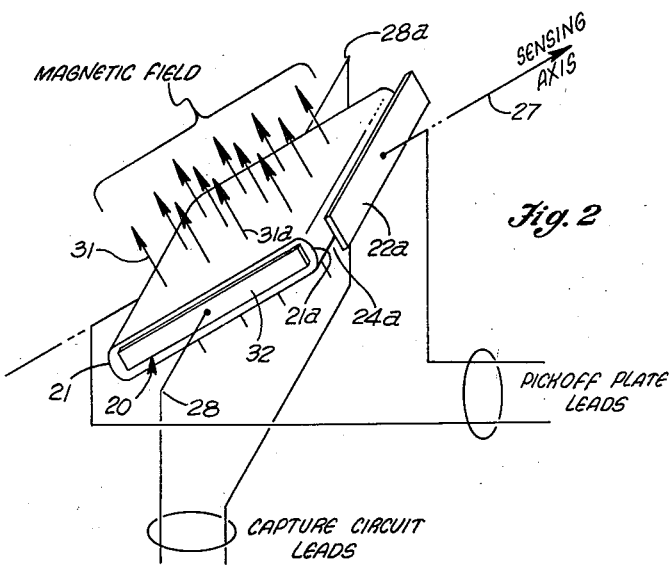
HUGH E. RIORDAN
INVENTOR.
BY
attorneys Feb. 18, 1964    H. E. RIORDAN    3,121,336
LINEAR MERCURY ACCELEROMETER
Filed Nov. 8, 1960    2 Sheets-Sheet 2

HUGH E. RIORDAN
INVENTOR.

BY Andrew L. Bain
attorneys

3,121,336
LINEAR MERCURY ACCELEROMETER
Hugh E. Riordan, Wyckoff, N.J., assignor to General Precision, Inc., Little Falls, N.J., a corporation of Delaware
Filed Nov. 8, 1960, Ser. No. 68,096
2 Claims. (Cl. 73—516)

This invention relates to accelerometers suitable for use in high speed aircraft, guided missiles and the like.

The invention contemplates a rectilinear accelerometer, in which a small mercury mass is utilized as a means of determining acceleration along any axis in one plane.

The operation of the accelerometer is based on the displacement of the free-surface ends of a globular body of mercury relative to a container in which the mercury is supported, electrical means being provided for sensing and measuring this displacement.

Another feature of the construction is that the mercury body and the housing in which it is supported are so constructed that the maximum displacement of the ends of the body is limited to the maximum which can be accommodated by deformation of the meniscus of the body without movement of the body as a whole relative to the container in which it is supported.

A primary object of the invention is to provide a compact accelerometer which can be utilized to determine rectilinear accelerations.

Another object is to provide an accelerometer in which a small globular mass of mercury in a closed chamber is used for measuring velocity or acceleration.

The accompanying drawings, illustrative of one embodiment of the invention, together with the description of its construction and the method of operation, control, and utilization thereof, will serve to clarify further objects and advantages of the invention.

FIGURE 1 is a schematic, sectional view along the sensing axis of an accelerometer embodying the present invention;

FIGURE 2 is a schematic perspective view of a portion of the accelerometer shown in FIGURE 1;

FIGURE 4A is a fragmentary section along the sensing axis of an accelerometer embodying the invention and showing the mercury body under conditions of zero acceleration;

FIGURE 4B is a view similar to FIGURE 4, showing the mercury body as it appears with the accelerometer subjected to acceleration to the left as viewed in FIGURE 4;

Figure 5:
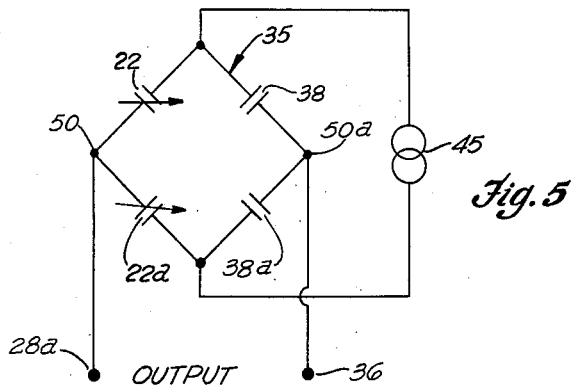
FIGURE 5 is an equivalent circuit diagram representing a portion of the circuit shown in FIGURE 3.
Figure 6:
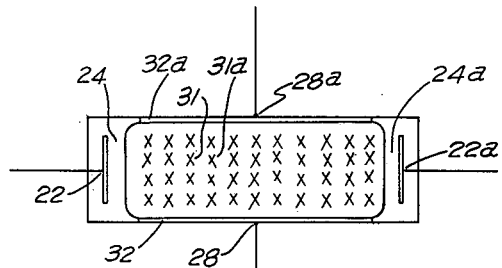
FIGURE 6 is a schematic view taken on the line 6—6 of FIGURE 1.

It will be understood that the following description of the construction and the method of support, wiring, operation and utilization of the accelerometer is intended as explanatory of the invention and not restrictive thereof.

One form of construction, shown in FIGURE 1, comprises a permanent magnet 10 having two sections 10a, 10b, defining a central cavity or passage 11, of substantially rectangular cross-section through the center thereof. A combination housing and field structure 12 surrounds and supports the permanent magnet, the field structure including a housing 14 having a pair of end walls 15, 15a and a bottom wall 16 integral with or fixedly attached to the end walls. The longitudinal distance between the inner surfaces of end walls 15, 15a is greater than the corresponding dimensions of permanent magnet 10 so that respective gaps 18, 18a are formed between the magnet and the adjacent inner surfaces of the end walls.

Figure 3:
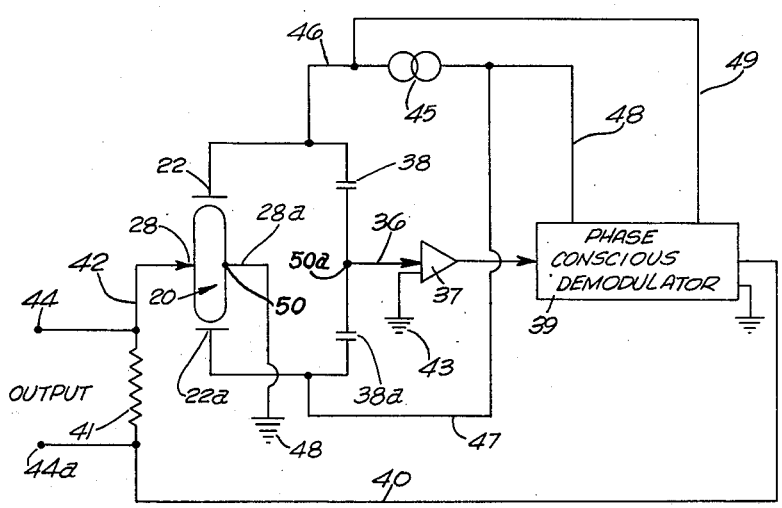
FIGURE 3 is a schematic diagram of the electrical circuitry used in conjunction with the accelerometer of FIGURES 1 and 2.

A flat cap 19, the contour of which follows the outer contour of the housing 14, is attached and sealed to the open upper end of the housing. The interior of housing 14 is evacuated to provide a minimum of resistance to the longitudinal movement of the ends of mercury body 20, which is inserted in cavity 11. The operation and movement of the mercury body is shown in FIGURES 2 and 3 and hereinafter described in greater detail.

Mercury body 20 is in the form of a relatively thin rectangular prism of mercury, having menisci 21, 21a of approximately semi-circular cross-section, as shown in FIGURE 4. The thickness dimension or height of the mercury body must be sufficiently small that surface tension in its upper and lower surfaces will prevent its fragmentation under normal operating accelerations.

Adjacent the ends of the menisci of mercury body 20, capacitor pick-off plates 22, 22a are mounted. The pick-off plates, one of which is shown in detail in FIGURE 2, sense the longitudinal movement of the meniscus ends of the mercury body relative thereto as hereinafter described in greater detail.

Each of the pick-off plates 22, 22a has a connecting wire 29, 29a attached thereto passing through an aligned opening in the adjacent end walls 15, 15a of the housing, the connecting wires and the pick-off plates being supported by the adjacent end walls 15, 15a of the housing. These plates may be insulated from the chamber or cavity 11 in which the mercury is placed to prevent breakdown across the gap 24, 24a between each end of the mercury body and the adjoining pick-off plates 22, 22a. These gaps 24, 24a and the other gaps 18, 18a located at the opposite side of the pick-off plates 22, 22a are evacuated except for the pressure of mercury vapor formed from the mercury body 20.

As shown in FIGURE 3, pick-off plates 22, 22a are connected differentially and are, therefore, relatively independent of temperature expansion variations in the length of the mercury body, which would be relatively uniform at both ends, thus obviating the necessity for temperature compensation.

FIGURE 4A shows the normal static position of the mercury body 20, relative to the upper and lower wall surfaces 26, 26a of the cavity through the magnets 10a, 10b with the menisci 21, 21a of the mercury body in their normal position.

In order to avoid skin friction between the mercury and the adjacent walls of the cavity 11, the maximum displacements of the mercury due to acceleration is limited by the maximum internal movement of the mercury which can be accommodated by deformation of the menisci without disturbing the line contact between the wall surfaces 26, 26a, and the adjacent mercury surfaces. Acceleration forces cause distortion of menisci 21, 21a from the contour and position shown by dotted lines, FIGURE 4B, to those designated 21b, 21c. Thus, while the tips of the menisci of the mercury body are moved to some extent, there is no relative movement between the surfaces 26, 26a of the magnet walls and the contiguous surfaces for the mercury body.

As shown in FIGURE 2, capture of the mercury body 20 is effected by a force developed by the passage of an electric current, via lines 28, 28a, through the body in a direction substantially perpendicular to the sensing axis 27, the capture current being supplied by a phase conscious demodulator 39, shown in FIGURE 3.

The capture current is sent through mercury body 20 by means of capture electrodes 32, 32a which extend along the sides of cavity 11 parallel to sensing axis 27 and in contact with the mercury body.

The magnetic lines of force 31, 31a passing from one magnet section 10b to the other magnet section 10a, shown in FIGURE 2, are substantially perpendicular to the plane of the mercury body and sensing axis 27.

The pick-off plates 22, 22a coact with the ends of mercury body 20 and intervening air gaps 24, 24a to define variable capacitors 22', 22a' the capacitance of which varies with the width of the air gaps.

FIGURE 5 shows a Wheatstone bridge 35 representing a portion of the circuit shown in FIGURE 3; in the bridge, pick-off capacitors 22', 22a' represent the two adjacent legs and compensating capacitors 38, 38a constitute the two remaining legs.

The bridge is connected with the variable capacitance legs in parallel with the reference capacitance legs across an A.C. excitation voltage source. The bridge output is derived across the other diagonal, i.e., between junctions 50 and 50a. The A.C. excitation voltage is supplied also to a phase conscious demodulator 39 via conductors 48, 49.

When the bridge is unbalanced by movement of the mercury body and the consequent change in the capacitance 22', 22a', a signal appears on line 36 leading to preamplifier 37, shown in FIGURE 3.

The amplified signal is fed through phase conscious demodulator 39, the output of which is passed via line 40, resistor 41, shown in FIGURE 3.

The current through the capture contacts 32, 32a is proportional to the force required to balance the acceleration force exerted on the mercury body 20 when the apparatus is accelerated, thus maintaining the body as a whole against displacement. The output of the apparatus is, therefore, the voltage drop across the resistor 41, which is measured between the terminals 44, 44a shown in FIGURE 3 and is proportional to the acceleration to which the apparatus is subjected.

It will be apparent to those skilled in the art, that the present invention is not limited to the specific details described above and shown in the drawing, and that various modifications are possible in carrying out the features of the invention and the operation and the method of support, circuitry, mounting, and the method of utilization thereof, without departing from the spirit and scope of the appended claims.

For example, any appropriate metallic alloy or electrically conductive medium which is fluid at the temperature at which the instrument is to be operated may be substituted for the mercury, provided such medium is not subject to gaseous decomposition upon the passage of an electric current therethrough.

What is claimed is:
1. A linear accelerometer comprising:
   means defining an elongated cavity of rectangular cross-section and having a thickness dimension small in comparison to its length and width, said means including a permanent magnet directing a flux field through the cavity in its thickness direction;
   capacitor electrodes at the respective ends of said cavity;
   a pair of spaced capture electrodes disposed along substantially the entire length of said cavity on respective sides thereof parallel to said flux field, at least the inner surfaces of said cavity being of dielectric material except for said capture electrodes;
   a globular body of mercury in said cavity having positive menisci at its respective ends adjacent, and defining respective pick-off capacitors with, said capacitor electrodes, said mercury otherwise substantially filling said cavity;
   a bridge circuit having said pick-off capacitors in two adjacent legs and compensating capacitors in the remaining legs adapted to balance the bridge in the absence of accelerational forces on the body of mercury;
   means for applying an A.C. excitation voltage across a diagonal of the bridge circuit so that said two legs and said remaining legs are in parallel with respect to the excitation voltage; and
   a phase conscious demodulator connected to supply to the capture electrodes an electric current varying in direction and magnitude with a signal appearing across the other diagonal of said bridge circuit.
2. A linear accelerometer according to claim 1, including a load impedance in series with said capture electrodes for developing an output signal proportional to the capture current flow and, therefore, to accelerational forces tending to displace said mercury body.

References Cited in the file of this patent
UNITED STATES PATENTS

| | | |
|---|---|---|
| 2,532,883 | Bennett et al. | Dec. 5, 1950 |
| 2,591,921 | Cosgriff et al. | Apr. 8, 1952 |
| 2,735,949 | Podolsky | Feb. 21, 1956 |
| 2,753,469 | Statham et al. | July 3, 1956 |
| 2,869,851 | Sedgfield et al. | Jan. 20, 1959 |
| 2,936,711 | Watt | May 17, 1960 |
| 2,938,390 | McFee | May 31, 1960 |
| 2,983,149 | Lees | May 9, 1961 |

FOREIGN PATENTS

| | | |
|---|---|---|
| 708,228 | Great Britain | Apr. 28, 1954 |